United States Patent [19]

Takashino

[11] 3,918,660

[45] Nov. 11, 1975

[54] BRAKE MECHANISM FOR MAGNETIC TAPE RECORDING AND REPRODUCING APPARATUS

[75] Inventor: Shizuo Takashino, Ichikawa, Japan

[73] Assignee: Sony Corporation, Tokyo, Japan

[22] Filed: July 23, 1974

[21] Appl. No.: 491,064

[30] Foreign Application Priority Data

Aug. 9, 1973 Japan .............................. 48-89473

[52] U.S. Cl. .............................. 242/204; 242/208
[51] Int. Cl.² .................... G03B 1/04; G11B 15/32
[58] Field of Search .......................... 242/200–204, 242/208; 360/74

[56] References Cited

UNITED STATES PATENTS 3,357,650 12/1967 Sato .................................. 242/201

FOREIGN PATENTS OR APPLICATIONS 1,032,939 3/1960 Germany ........................... 242/203
2,135,121 2/1973 Germany ........................... 242/203

*Primary Examiner*—Leonard D. Christian
*Attorney, Agent, or Firm*—Lewis H. Eslinger, Esq.; Alvin Sinderbrand, Esq.

[57] ABSTRACT

In an apparatus for recording and/or reproducing signals on a magnetic tape which is wound on supply and take up reels and has its ends secured to the reels, the reels are rotationally coupled with respective reel support members that are selectively urged to rotate in the direction for winding tape on the respective reel upon the manual actuation of a control for causing operation of a reel drive means which includes a transmission system having a freely rotatable idler wheel mounted in the apparatus for movement between the plurality of positions in and out of driven engagement with the main drive wheel of the drive means, which idler wheel is engaged against one of the reel support members, upon deactivation of the drive means, with sufficient force to brake the rotation of that support member.

11 Claims, 9 Drawing Figures

BRAKE MECHANISM FOR MAGNETIC TAPE RECORDING AND REPRODUCING APPARATUS

The present invention relates to a magnetic tape recording and/or reproducing apparatus and, more particularly, is directed to a braking mechanism for rapidly stopping the rotation of the tape reels upon shut off of the apparatus.

With the advent of magnetic tape cassettes, the development of low cost and easily operated recording and/or reproducing apparatus for using such cassettes has become desirable. Such apparatus must be capable of performing all of the tape driving functions required for the recording and reproducing operation. Thus the apparatus must be simply controllable to provide for advancement or forward movement of the tape at a relatively slow speed during recording and reproducing operations, and also must provide for relatively fast reeling of the tape in either the forward or reverse directions.

Since the magnetic tape cassettes used with such apparatus have the tape wound on supply and take up reels which are confined within the cassette housing, with the tape physically secured to the reels at its opposite ends, it is imperative that when the drive to the supply and take up reels is stopped the rotation of the reels be simultaneously and rapidly stopped. This is required since if the reels are not properly stopped or braked they would have a tendency to continue rotation due to their inertia, producing forces on the tape which might tend to break the tape or detach it from one of the reels. If this occurs, the cassette housing must be taken apart to permit rethreading of the tape about the guides provided therefor within the cassette and connection of the tape to the reel from which it has become detached, or splicing of the tape itself. Obviously, the need to disassemble the cassette housing and to rethread the tape within the cassette would sacrifice the major advantage of the cassette type recording and/or reproducing apparatus, i.e. its normal convenience in operation and use.

Although a number of brake arrangements have been proposed and utilized for stopping the rotation of the tape reels or tape reel support members within cassette type tape recording and reproducing apparatus, such existing arrangements have certain disadvantages. One typical arrangement uses a single bar having two friction pads which are engaged against the reel support members of the apparatus to brake simultaneously both of the reel support members, and thus both of the tape reels within the cassette mounted thereon. However, this type of braking arrangement is rather bulky, requiring a substantial amount of space within the recording and/or reproducing apparatus, and relies only on friction to stop the reel support members, so that these members can possibly continue to rotate slightly against the friction exerted by the brake member, due to the inertia of the coupled tape reels, thereby creating forces in the tape which may tend to break or detach the tape from one of the reels. In addition, it has been found desirable to brake the tape reel support members separately and in rapid succession, in order to avoid the creation of excessive forces in the tape during the braking operation.

Accordingly, it is an object of this invention to provide a recording and/or reproducing apparatus for use with conventional or standardized tape cassettes which includes an improved brake assembly for halting rotation of the tape reels.

Another object of the present invention is to provide a recording and reproducing apparatus having a brake assembly which will stop rotation of a tape reel support member in the apparatus and which will cause counter-rotation of the reel to tighten tape thereon on shut off of the apparatus.

Yet another object of the present invention is to provide a magnetic recording and/or reproducing apparatus with an improved braking device, as aforesaid, which apparatus is relatively simple and inexpensive to produce and capable of reliable operation without the need for frequent or costly maintenance or repairs.

A further object of the present invention is to provide a magnetic recording and/or reproducing apparatus with a braking device of compact and lightweight construction which is suitable for use in compact recording and reproducing devices.

In accordance with an aspect of this invention, an apparatus for recording and/or reproducing signals on a magnetic tape extending between two tape reels to which the ends of the tape are secured and on which the tape is wound, for example, within a cassette, includes a pair of rotatable reel support members for respective rotational coupling with the two tape reels. A drive means is provided which includes an electric motor controlled by a switch having a normal inoperative condition and being actuable to an operative condition for energizing the motor. A transmission means or assembly is operatively connected between the motor and the reel support members for selectively driving the reels in forward and rewind directions. The operation of the drive means and transmission is controlled by a control assembly including means movable from an inoperative position to an operative position for actuating the switch to the operative condition thereof and simultaneously controlling the transmission to drive the reel support members in the selected direction at the selected speed. The transmission includes means for applying a braking force to at least one of the reel support members when the actuating means is moved to its inoperative condition. In a further embodiment of the invention the transmission means includes means for rotating at least one of the reel support members in a direction opposite to the driving direction when the actuating means moves from its operative to its inoperative position, in order to tighten the tape on the reels as they are braked.

The above, and other objects, features and advantages of this invention, will be apparent from the following detailed description of illustrative embodiments thereof which are to be read in connection with the accompanying drawings, wherein.

Figure 1:
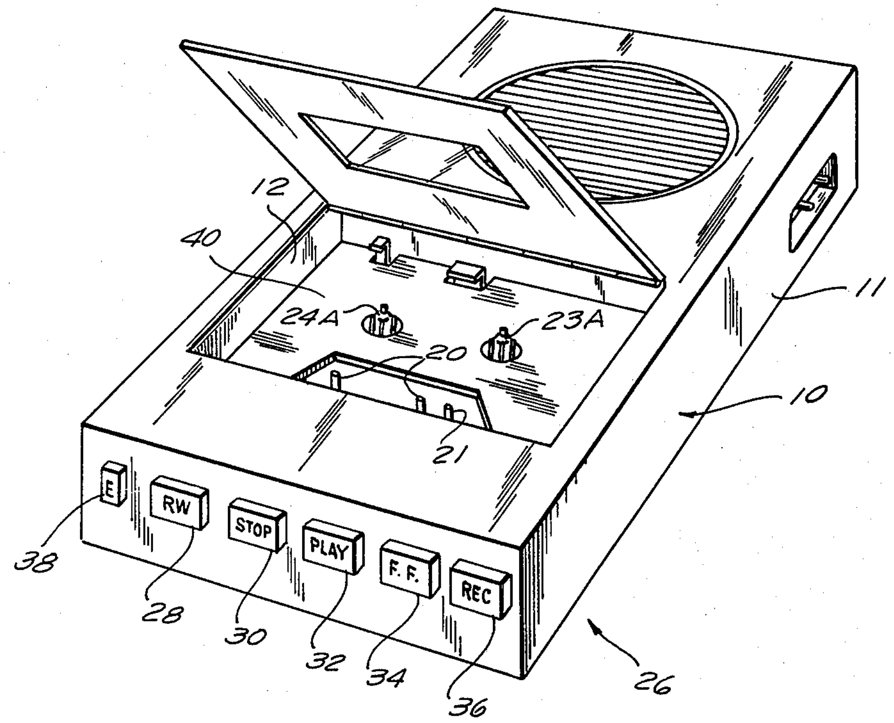
FIG. 1 is a perspective view of a magnetic recording and/or reproducing apparatus of the type which may be provided with a braking device in accordance with the present invention.
Figure 2:
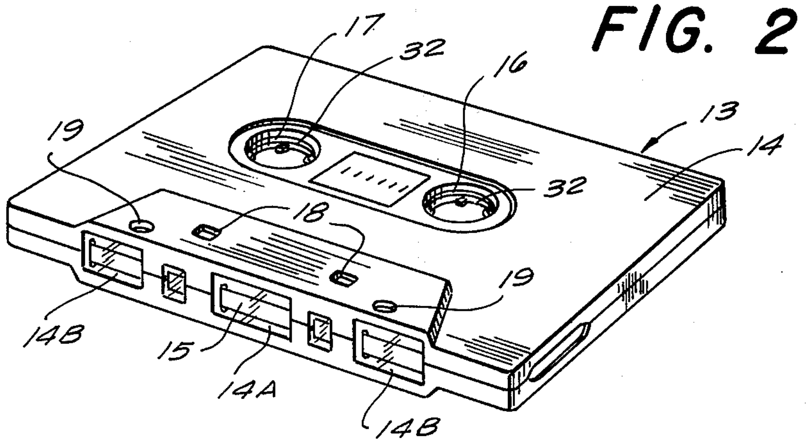
FIG. 2 is a perspective view of a conventional or standardized tape cassette that may be employed in the apparatus of FIG. 1.

Referring to the drawing in detail, and initially to FIG. 1 thereof, it will be seen that a magnetic recording and/or reproducing apparatus 10 of a type that is provided with a braking device according to the present invention includes a casing 11 provided with a recess or cavity 12 for reception of a tape cassette 13, shown in FIG. 2.

Cassette 13 includes a housing 14 containing a tape 15 which is wound on reels 16 and 17 that are freely rotatable within the housing in a conventional manner. As is usually the case, the opposite ends of tape 15 are secured to reels 16 and 17, respectively, and the portion of the tape extending between the reels is directed by guides (not seen in the drawing) within cassette housing 14 so as to travel along the front edge wall of the cassette for exposure at openings or windows 14A and 14B.

The top and bottom walls of the cassette housing are provided, adjacent the front edge of the housing, with a pair of laterally spaced openings 18 and a pair of further laterally spaced apart openings 19 which, when the cassette is disposed within cavity 12 of casing 11, receive locating pins 20 projecting upwardly in the cavity for precisely locating the cassette therein. The capstan 21 of the device 10 also projects upwardly within cavity 12 and extends into one or the other of the openings 19 of the cassette and thus is located adjacent the magnetic tape 15 passing one of the windows 14B provided in the cassette housing.

The top and bottom walls of the cassette are further shown to have the usual openings 22 registering with internally spleened hubs of reels 16 and 17 so that, when the cassette is disposed in cavity 12, such internally spleened hubs of the reels can receive and be rotatably coupled with the similarly spleened rotatable wheel drive shafts 23A and 24A of reel support members 23 and 24 (FIG. 3) which project upwardly into cavity 12.

The recording and reproducing apparatus 10 includes a control assembly 26 (FIG. 3) having pushbuttons 28, 30, 32, 34 and 36 that are manually actuable to select respective operating modes of the apparatus. For example, when cassette 13 is located within cavity 12, manual depression of pushbutton 32 is effective to cause the normal or relatively slow speed advance of tape 15 in the forward direction, i.e. in the direction unwinding the tape from supply reel 17 and winding up the tape on take up reel 16, as during the playback or reproducing of signals recorded on the tape, or during the recording of signals on the tape when the play button 32 and record button 36 are simultaneously actuated. Similarly, pushbuttons 34 and 28 are effective to control the fast forward movement and fast rewinding movement, respectively, of the tape; whereas the pushbutton 30 is employed for halting the tape drive at any desired time during any of the selected operating modes of apparatus 10, as hereinafter described in detail. Finally, a pushbutton 38 may be provided which is connected to a pivoted plate 40 in cavity 12 for ejecting a cassette in the cavity when desired, in the conventional manner.

Figure 3:
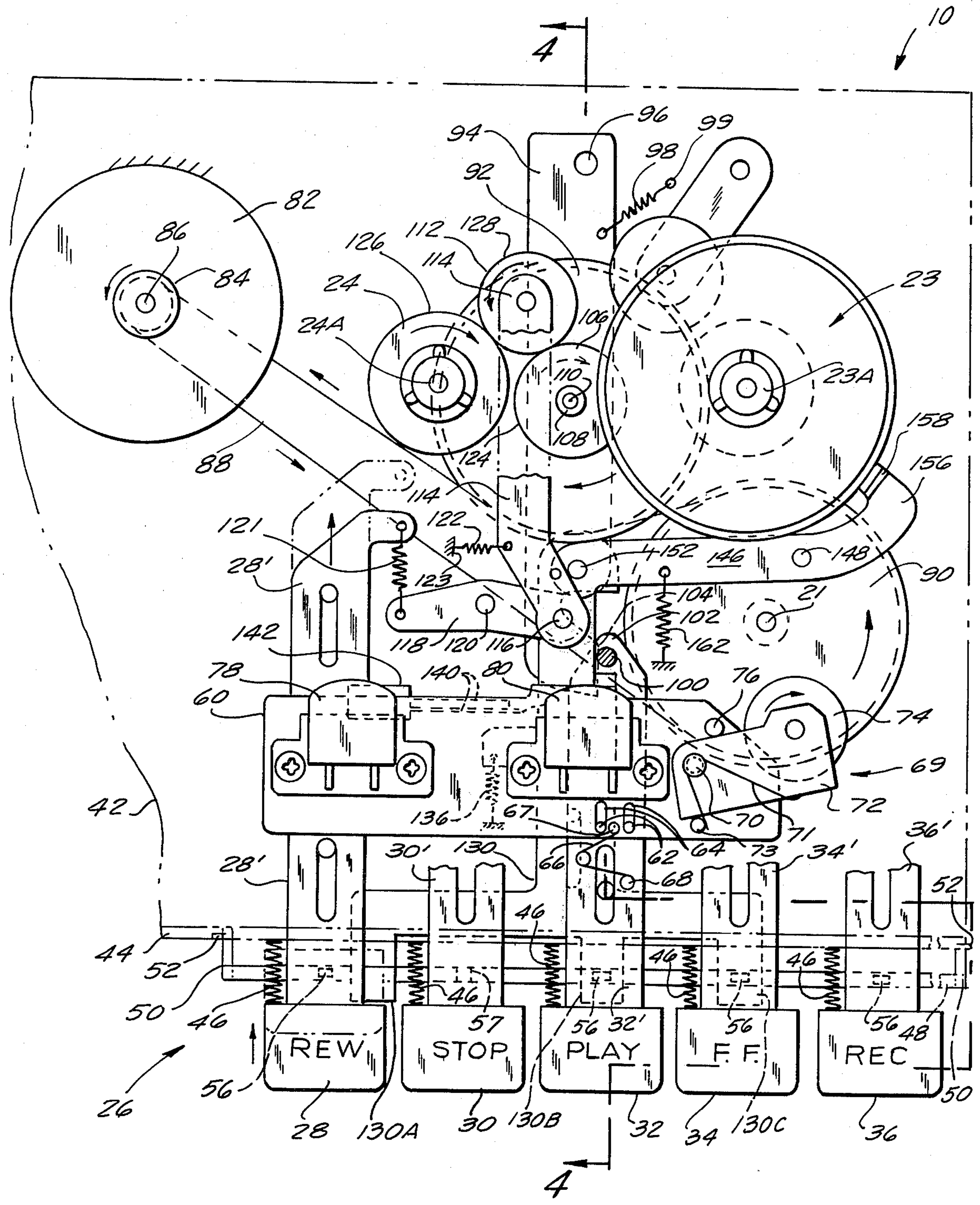
FIG. 3 is an enlarged top plan view of the apparatus of FIG. 1, but with its housing removed and with certain elements thereof broken away or shown in dotted lines for clarity.
Figure 4:
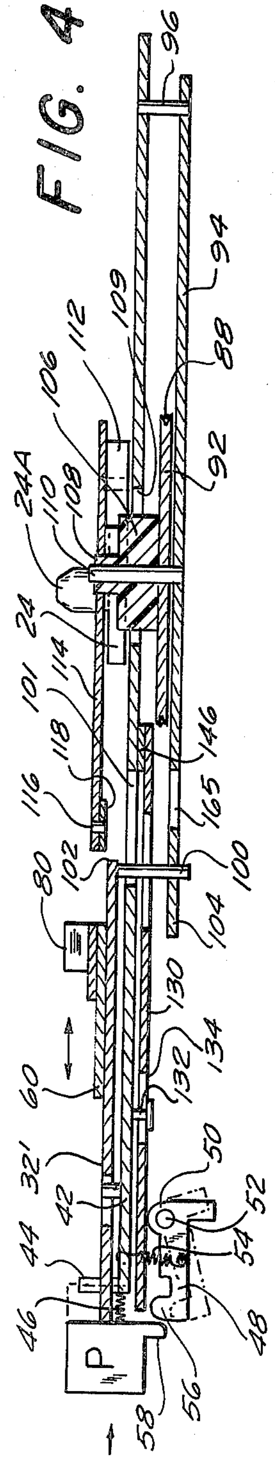
FIG. 4 is a sectional view taken along lines 4—4 of FIG. 3.

Referring to FIGS. 3 and 4 of the drawing, it will be seen that the mode selecting pushbuttons 28–36 are each independently mounted and include a slidable actuator bar 28'–36' respectively associated therewith. The actuator bars are slidably mounted within a mounting or chassis plate 42 (which is shown in dotted lines in FIG. 3 for clarity, in order to expose the elements of the device mounted on the lower side of the plate). The actuator bars slide in slots in an upturned flange 44 on plate 42 and are spring biased towards their outer-inoperative positions by compression springs 46 or the like, in a conventional manner.

The control assembly 26 further includes a latch member or bar 48 which is pivotally mounted at its ends 50 on pivot pins 52 (FIG. 4) pivotally mounted in the plate 42 by brackets or the like (not shown) in any convenient manner. The latch bar extends forwardly under all of the pushbuttons from the pivot axis defined by pins 52. A spring 54 (FIG. 4) is connected between latch 48 and plate 42 for urging the latch member upwardly to its latching position shown in full lines in FIG. 4. The upward or clockwise pivotal movement of the latch member under the influence of spring 54 is limited to the position shown in FIG. 4 by a stop member (not seen) formed on the latch and located to abut against the lower surface of the plate 42.

Latch 48 is formed with a plurality of individual, laterally spaced apart abutment keepers 56 which respectively register with the pushbuttons and which are adapted to receive a latch element 58 depending from the respective pushbutton when the pushbutton is manually displaced or pressed to its operative position against the bias of its associated spring 46. Thus, it will be appreciated that as any one of the pushbuttons 28–36 is depressed to its operative position (as indicated for example with dotted lines with respect to pushbutton 28 in FIG. 3) the respective latch element 58 of that pushbutton rides on its associated keeper element 56 of latch 48 to depress the latch against the force of spring 54 until such time as the latch element 58 is received behind its associated keeper or abutment 56 allowing the latch to return to its solid line position in FIG. 4 under influence of spring 54. Thereafter, latch 48 retains the previously depressed pushbutton in its operative position until such time as the latch is rocked to its release position, i.e. in a counterclockwise direction against the bias of spring 54, as shown in dotted lines in FIG. 4, whereupon any previously depressed pushbutton is free to be returned to its inoperative position by its associated spring 46 due to the disengagement of the keeper element 56 and the latch member 58.

At the location of the stop button 30, the latch 48 simply has an inclined ramp 57 formed thereon engageable by the latch element 58 of the stop pushbutton, and does not have a keeper abutment formed thereon. Thus, whenever the stop button 30 is depressed to its operative position, the element 58 thereof engages the inclined abutment on latch 48 and depresses the latch member in a counterclockwise direction to its release position, thereby to release the latch element 58 of any of the other pushbuttons which had been previously retained in the operative position thereof.

Referring again to FIG. 3, it will be seen that the apparatus 10 further includes a carriage 60 which is disposed on top of the chassis plate 42 and is mounted on the actuator bar 32' of the play pushbutton 32; and is guided for movement thereon, for example, by pins 62 extending upwardly from bar 32' through slots 64 in the carriage 60. The carriage is yieldably urged in the forward direction on bar 32' by a coil spring 66 connected between an abutment pin 67 on the carriage and an abutment pin 68 on bar 32'. In addition, a pinch roller assembly 69 is pivotally mounted on a post 70 on carriage 60 and includes a bracket 72 on which the pinch roller 74 is rotatably supported. A coil spring 71 mounted on post 70 and engaged between bracket 72 and an abutment pin 73 on carriage 60 biases the bracket in a counterclockwise direction about post 70. The movement of bracket 72 under the influence of spring 71 however, is limited by a stop pin 76 on the carriage 60. In this manner, the pinch roller is moved toward and away from capstan 21 with carriage 60, upon actuation of the play pushbutton.

An erasing head 78 and a recording and reproducing head 80 are secured to carriage 60 so that, when a cassette 13 is disposed in cavity 12 and carriage 60 is moved to its operative position by depression of pushbutton 32, the heads 78, 80 will be engaged with the tape 15 exposed at windows 14B and 14A respectively of the cassette housing. In this position, the tape 15 exposed at the window 14B of the cassette housing opposite to that at which erasing head 78 engages the tape, will be engaged between the capstan 21 and the pinch roller 74 so as to be advanced thereby in response to rotation of the capstan.

The recording and reproducing apparatus 10 includes a drive assembly for rotating capstan 21 and the reel drive shafts 23A, 24A upon operation of the pushbuttons 28, 32, 34 and 36. This drive assembly includes an electric motor 82 mounted in any convenient manner on chassis plate 42 and having a drive pulley 84 secured to the motor shaft 86 for driving a belt 88 which is wrapped about the grooved periphery of a capstan flywheel 90 and engaged with the grooved periphery of a main drive flywheel 92. The flywheels 90, 92 are disposed below the chassis plate 42 (which is shown in dotted lines in FIG. 3 for clarity), with the capstan flywheel being rotatably mounted in a suitable bearing (not shown) carried by the chassis plate 42 through which the central shaft of the flywheel extends to provide the capstan 21. The main drive flywheel 92, on the other hand, is rotatably mounted on a movable support lever 94 pivotally mounted at 96 below the chassis plate 42 (see FIG. 4) by a suitable bearing (not shown).

Lever 94 is biased in a counterclockwise direction, i.e. towards the reel drive shaft 23A, by a spring 98 operatively connected between the lever and a tab 99 extending downwardly from the chassis plate 42. However, in all modes of operation of the device, except the play mode, the main drive flywheel 92 is held in the relative position illustrated in FIG. 3, against the bias of spring 98, by an abutment pin 100 which extends downwardly from the free end 102 of actuator bar 32', through a slot 101 (FIG. 4) in chassis plate 42, against the side edge 104 of the lever 94.

In the illustrated drive assembly, the belt 88 is arranged with respect to the direction of rotation of motor 82, capstan flywheel 90, and main drive flywheel 92 so that, upon energization of motor 82, the capstan flywheel 90 is rotated in a counterclockwise direction, while the main drive flywheel 92 is rotated in a counterclockwise direction, as viewed in FIG. 3 and illustrated by the solid arrows therein.

The apparatus 10 further includes a transmission assembly which, in accordance with the mode of operation selected by manual actuation of the respective control buttons 28, 32, 34, transmits rotary movement from the main drive flywheel 92 to a selected one of the red support members 23, 24 (which are rotatably mounted on the top surface of chassis plate 42) for rotating the selected reel support member in the direction for winding tape on the reel of cassette 13 which is respectively coupled therewith. This transmission assembly includes a first friction wheel 106 and a second friction wheel 108 thereabove, both of which are mounted on the shaft 110 of main drive flywheel 92 for rotation with the drive wheel. Alternatively, these friction wheels can be formed integrally with the flywheel for rotation therewith. In either case, these friction wheels extend upwardly from flywheel 92 through an enlarged opening 109 (see FIG. 4) in chassis plate 42.

The transmission system of the apparatus 10 also includes an idler wheel 112 which is rotatably mounted on a movable lever 114 for selectively engaging the idler wheel with the various elements of the transmission and drive systems in order to selectively drive the reel support members 23, 24 in the desired direction. Lever 114 is pivotally mounted by a pivot pin 116 which is rigidly mounted at one end of an auxiliary lever 118. The latter is pivotally mounted on a post 120, in any convenient manner, that extends upwardly from the upper surface of chassis plate 42. Lever 118 is operatively connected to the actuator bar 28' of the rewind pushbutton 28 through a resilient spring 121. The spring is connected to lever 118 on the side thereof opposite the pivot pin 116.

In the inoperative mode of the apparatus 10, i.e. with all of the pushbuttons in their outermost-inoperative positions, lever 114 is positioned, as illustrated in FIG. 3, under the influence of spring 121 and a biasing spring 122 secured between lever 114 and a tab 123 on the upper surface of the chassis plate 42. In this position idler wheel 112 is engaged against the periphery 124 of friction wheel 106 and the periphery 126 of reel support member 24. The peripheries of both wheel 106 and reel support member 24 have relatively broad surfaces against which the periphery 128 of idler wheel 112 is frictionally engaged.

In the rewind mode of operation of the device 10, depression of pushbutton 28 to the dotted line position thereof illustrated in FIG. 3, causes auxiliary lever 118 to pivot in a generally clockwise direction, increasing the force on lever 114 and drawing the idler wheel 112 into tighter engagement with friction wheel 106 and reel support member 24. In this position, upon rotation of the main drive wheel 92, the idler wheel 112 is driven in a counterclockwise direction to in turn drive reel support member 24 in a counterclockwise direction in order to rewind tape onto the tape reel 17 coupled with the reel drive shaft 24A. When the drive to motor 82 is stopped, as for example upon actuation of the stop button 30 (as more fully described hereinafter) pushbutton 28 returns to its initial position under the influence of associated spring 46, but springs 121, 122 exert a sufficient force on lever 114 to keep the idler wheel 112 engaged with the peripheries of friction wheel 106 and reel support member 24 to cause the idler wheel to brake the rotation of the reel support member 24 and bring it to a substantially instantaneous stop. As described more fully hereinafter, whenever the operation of the apparatus 10 is stopped, i.e. when the drive to the main drive flywheel 92 is stopped, idler wheel 112 returns to the position illustrated in FIG. 3 in order to brake the rotation of reel support member 24.

In order to further control the operation of the transmission assembly and the actuation and deactuation of motor 82, the apparatus 10 further includes a generally Y-shaped plate 130 which is slidably mounted below the lower surface of chassis plate 42 (FIG. 4) for movement towards and away from the main flywheel 92 by means of a pin 132 depending from chassis plate 42 and engaged loosely in a slot 134 formed in the control member. The latter is biased into its forwardmost position (shown in FIG. 3 and shown in dotted lines in FIG. 5) by means of a spring 136 engaged between a tab depending from chassis plate 42 and an extension arm 138 of the control member.

The Y-shaped control member 130 includes forward diverging arm portions 130A, 130B and 130C which are respectively located in engagement with the back surfaces of the control pushbuttons 28, 30, 34 by the action of the spring 136. Thus, it will be appreciated that upon actuation or depression of any of the pushbuttons 28, 32, 34 the plate 130 will be urged inwardly of the edge 44 of chassis plate 42 towards the main flywheel 92 and will be held in its inner position (illustrated in solid lines in FIG. 5) when the depressed pushbutton is held in its operative position by the latch member 48, as previously described. This inward movement of control member 130 causes its extension 138 to engage one of the spring contact elements 140 of a switch 142, thereby closing the spring contacts of the switch. The latter is operatively connected to the motor 82 and to a source of current (e.g. a battery not shown) so that when the switch contacts 140 are closed the motor 82 is operated. Thus it will be appreciated that upon actuation of any of the buttons 28, 32, 34 the motor 82 is activated. Of course, when the pushbuttons 28, 32 or 34 are released from their operative position, as for example upon release of latch 48 by depression of stop button 30, the previously depressed button moves to its inoperative position and plate 130 returns to its outermost position (illustrated in dotted lines in FIG. 5), allowing the switch contacts 140 to open, thereby disconnecting power to motor 82 to stop the motor.

Control member 130 is utilized in the apparatus of the present invention to operate a separate brake mechanism 144 (FIG. 5) for the other reel support member 23. This brake support mechanism includes a lever 146 pivotally mounted below chassis plate 42 on a post 148 depending therefrom, and is pivotally connected at its end 150 by a pivot pin 152 on the inner end 154 of control member 130. The opposite end 156 of lever 146 includes an upstanding tab 158 which extends through a slot (not shown) in chassis plate 42 for engagement with the peripheral surface 160 of reel support member 23. Tab 158 is normally held in engagement against the periphery 160 of reel support member 23 in the inoperative condition of the apparatus 10 under the influence of the control member 130 and its associated spring 136. An additional spring 162 can be provided which is connected between the lever 146 and a tab 163 depending downwardly from the lower surface of chassis plate 42, which spring, in conjunction with the force supplied by spring 136, will tightly hold tab 158 against the peripheral surface 160 in order to prevent rotation of reel support member 23. It will be appreciated that upon depression of any of the pushbuttons 28, 32, 34, causing inward movement of plate 130, lever 146 will be pivoted in a clockwise direction against the action of springs 136, 162, to free reel support member 23 for rotation. However, upon deactivation of motor 82, as for example when pushbutton 30 is depressed, control member 130 will be retracted to its dotted line position in FIG. 5, causing the lever 146 to rotate in a counterclockwise direction engaging tab 158 against the periphery 160 of reel support member 23, thereby applying a positive frictional braking force to that reel support member. This braking of reel support member 23 is independent of the braking of the reel support member 24 by idler roller 112, so that both of the reel support members are separately and positively braked.

Figure 6:
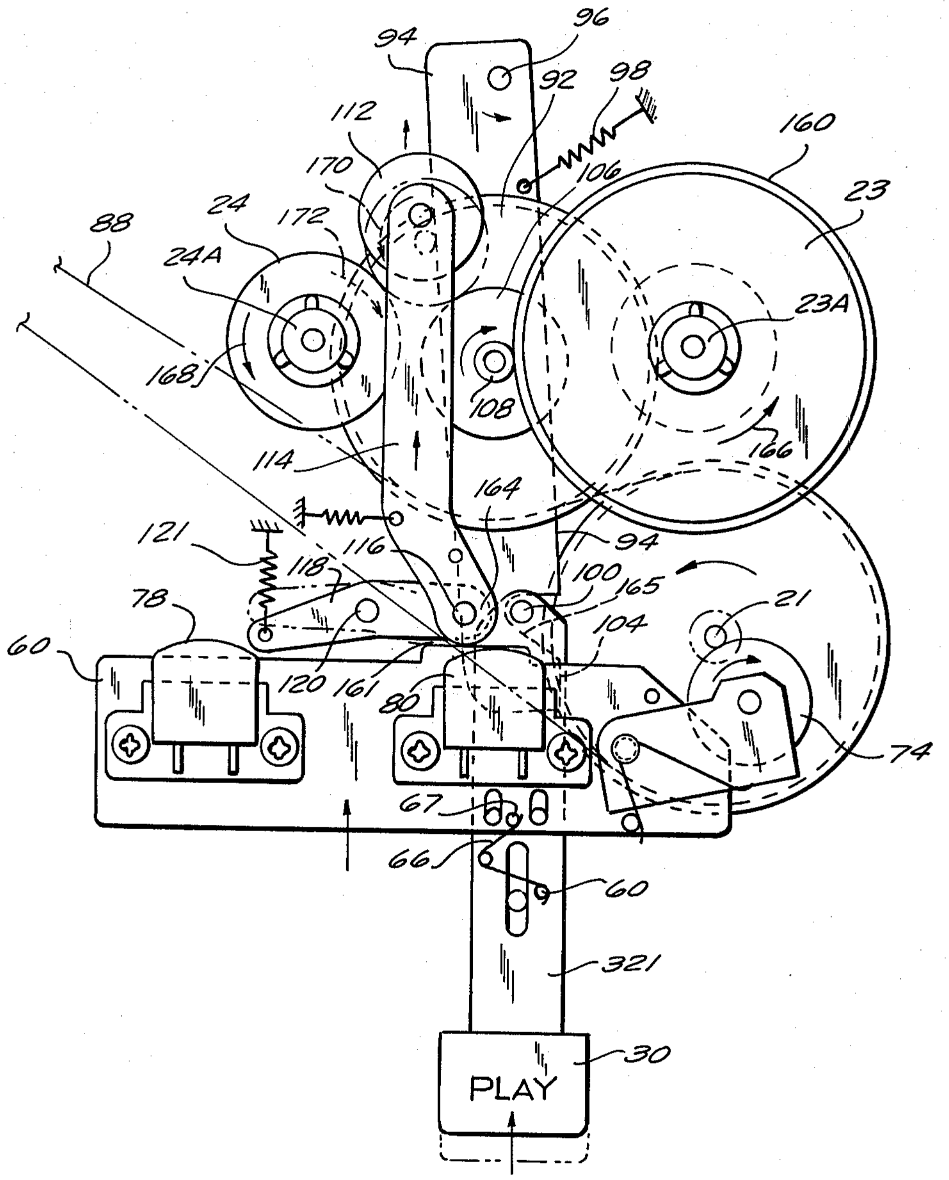
FIG. 6 is a partial plan view, similar to FIG. 1, showing the configuration of the elements of the device in the play mode of operation.

As mentioned, upon operation of any of the pushbuttons 23, 32, 34 the control member 130 is moved inwardly to release the brake surface 158 of lever 146 from the peripheral drive surface 160 of reel support member 23. The movement of these buttons in this manner simultaneously affects the operation or position of the brake-idler roller 112. The action of this roller in the rewind mode of operation of the apparatus has been previously described. The movement of the roller when the play pushbutton is depressed is illustrated in FIG. 6. As will be appreciated, FIG. 6 simply shows the transmission system, the play pushbutton and the carriage 60, with the other elements of the device removed for clarity of illustration.

As previously described, carriage 60 is mounted on the actuator 32' of play pushbutton 32 for movement therewith so that upon manual depression of pushbutton 32 from its inoperative to its operative position, the carriage 60 moves forwardly with the actuator bar 32 in order to engage pinch roller 74 with the capstan 21 and erasing head 78 and the recording head 80 with the tape in the cassette (as shown in FIG. 6). The movement of carriage 60 to this position causes the leading edge 161 thereof to engage against the end 164 of lever 114, adjacent pivot 116. Continued movement of the carriage to its final operative position, at which the pushbutton 32 is latched by latch 48, causes lever 114 to pivot auxiliary lever 118 and move to the solid line position thereof shown in FIG. 6. This is permitted because the auxiliary lever 118 is pivoted about pivot point 120, against the bias of spring 121, by the engagement of the carriage 60 against the end 164 of lever 114. In this manner, the idler roller 112 is moved from its normal dotted line position shown in FIG. 6 to its solid line position wherein it is out of engagement with both the reel support member 24 and the friction wheel 106 of main drive flywheel 92. In that position, it will be appreciated that the reel support member 24 is not driven but rather it is free to rotate under the influence of the pull on tape secured to the reel member of cassette 13 coupled with reel drive shaft 24A.

As the play pushbutton 32 is depressed, the pin 100 which extends downwardly therefrom as previously described, rides along the relatively straight edge portion 104 of lever 94 until it passes into a notch 165 formed in the edge of the lever. Once pin 100 reaches notch 165, the lever 94 is free to pivot about its pivotal mounting 96 under the influence of spring 98, so that the lever moves in a generally counterclockwise direction. Such movement, under the influence of spring 98, ultimately causes the smaller friction drive wheel 108 of the main drive flywheel 92 to engage the peripheral drive surface 160 of reel support member 23. Since main drive flywheel 92 is rotated in all modes of operation of the apparatus in a clockwise direction, the engagement of friction wheel 108 with the reel support member 23, causes the latter to rotate in a counterclockwise direction as indicated by the arrow 166 in FIG. 6. It will be apparent from the relative dimensions of the friction wheel 108 and the diameter of reel support member 23, that the reel support member will be driven at a relatively slow speed, such as is suitable for use with cassette type tape recorders.

This rotation of reel support member 23 will cause rotation of the tape reel in cassette 13 coupled with the reel drive shaft 23A thereof in the forward direction of operation of the device. Such rotation causes tape wound on the other reel of the cassette to be unwound therefrom, with the tension of the unwinding operation causing rotation of the reel support member 24 in a similar counterclockwise direction as indicated by the arrow 168 thereon in FIG. 6.

Upon completion of the play mode of the apparatus, the device is either automatically shut off by a mechanism such as that disclosed in co-pending U.S. patent application Ser. No. 495,297, filed Aug. 6, 1974, commonly assigned herewith, and the disclosure of which is incorporated herein by reference, or simply by the operation of the pushbuton 30 in the manner previously described, so that the play button 32 is released by latch 48 and caused to move from its operative to its inoperative position under the influence of its associated spring 46. This movement of the play button to its inoperative or outer position, causes carriage 60 to move outwardly and return to the position thereof illustrated in FIG. 3. Simultaneously, pin 100 on the actuator bar 32' moves against the inclined edge of notch 165 to the outer edge 104 of lever 94, therreby returning lever 94, in a counterclockwise direction, to the position thereof illustrated in FIG. 3 wherein the drive wheel 108 is out of engagement with reel support member 23. At the same time, carriage 60 is disengaged from the end 164 of lever 114, so that the lever can move from its solid line position in FIG. 6 to the position thereof shown in FIG. 3, under the influence of spring 121 which rotates auxiliary lever 118 from the solid line position thereof to the dotted line position shown in FIG. 6. As this occurs, idler wheel 112 is again engaged between the friction wheel 106 of main drive flywheel 92 and the periphery 126 of reel support member 24, causing the idler wheel to brake rotation of that reel support member.

Although the drive to motor 82 is simultaneously shut off by the movement of the play button to its inoperative position, because of the disengagement of the extension 138 of control member 130 from the switch contacts 140, the flywheel 92, because of its relatively great mass, will tend to continue to rotate of its own inertia, in the clockwise direction shown in FIG. 6. Accordingly, when idler wheel 112 is engaged, in its dotted line position in FIG. 6, with the rotating flywheel 92 and the counterclockwise rotating wheel support member 24, the idler wheel will tend to be rotated in a counterclockwise direction by continuing rotation of flywheel 92, as indicated by the dotted arrow 170 in FIG. 6. This counterclockwise rotation of idler wheel 112 tends to brake the counterclockwise rotating reel support member 24 and even to rotate it slightly in a clockwise direction, as indicated by the dotted arrow 172, counter to its original driven direction. As a result, the tape spanning between the two cassette reels coupled with the respective reel support members, is drawn or slightly rewound on the reel coupled with the reel support member 24, thereby to tighten the tape on the reels and avoid the formation of any tape slackness between the cassette reels as a result of the shut off of the apparatus.

It will be apparent that the operation of the apparatus, including the brake assemblies thereof is identical in both the play and record modes since in the record mode both pushbuttons 32, 36 are actuated simultaneously. In this mode record pushbutton 36 does not effect the drive or transmission assemblies but simply conditions the electrical circuits of the apparatus (not shown) to allow head 80 to record signals on tape 15.

Figure 5:
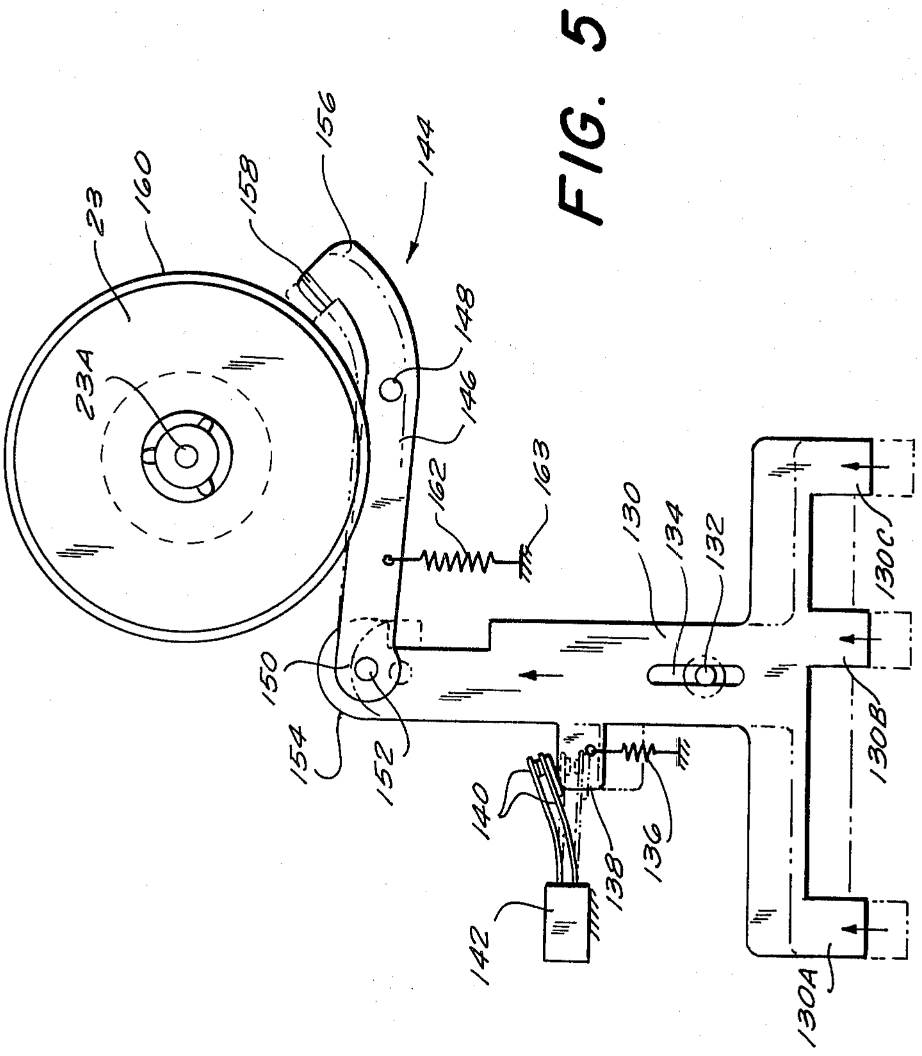
FIG. 5 is a partial plan view of the brake assembly used in connection with one of the tape reel support members of the device shown in FIGS. 1 and 3.

Of course, as previously described, the movement of pushbutton 32 to its inoperative position causes plate 130 to also move to its outermost position, shown in dotted lines in FIG. 5, causing lever 146 to return to its dotted line position with the friction surface or tab 158 thereof in braking engagement with the periphery 160 of the reel support member 23, thereby braking that reel support member. By appropriately dimensioning the respective levers 146 and 114, it will be seen that the lever 146 will brake reel support member 23 relatively rapidly upon disengagement of the pushbutton 32, and before the idler wheel 112 engages the reel support member 24, since that wheel must pass or move through a greater distance than the tab 158. Thus, in the play mode of operation, the driven reel support member 23 is braked before the free wheeling reel support member 24. This prevents breakage of the tape in the cassette coupled with the reel support members as may often happen with previously proposed devices wherein the free wheeling reel support member is braked before the drive wheel support member, thereby creating excessive forces in the tapes spanning between the reels mounted thereon. This feature, in combination with the fact that upon braking the idler wheel 112 tends to rotate the free wheeling reel support member 24 in an opposite direction from its prior direction of rotation, thereby to tighten the tape on the cassette reel associated therewith, not only serves to prevent breakage of the tape in the cassette but also insures that the tape is properly wound on the respective reels therein.

In this connection, it is noted that in the rewind mode of operation of the device, illustrated in FIG. 3, the reel support member 24 is driven while the reel support member 23 is allowed to free wheel, being rotated by the force exerted on the tape in cassette 13 as it is wound on the reel associated with the driven reel support member 24. In this case the idler wheel 112 is engaged with the driven reel support member 24 at all times, so that upon release of the rewind pushbutton 28, by depression of latch 48 upon actuation of the stop pushbutton 30, the braking force is immediately applied to the reel support member 24 while the braking force to the free wheeling reel support member 23 is applied slightly later, as the lever 146 pivots to engage its frictional surface or tab 158 with the periphery 160 of reel support member 23. Thus, it is also seen that in the rewind mode of operation the driven reel support member (24 in this mode) is braked first, so as to avoid the possibility of creating excess forces in the tape in the cassette coupled with the device.

It is noted that in braking reel support member 24 in any of the modes of operation of the device, the idler wheel 112 applies more than simply a frictional braking force to the reel support member. That is, the idler wheel 112 and lever 114 are located such that when the idler wheel is engaged with reel support member 24 it is also engaged with the friction wheel 106 of the main drive flywheel 92 at spaced locations along its own periphery which define a small arc, whereby the idler wheel is in effect squeezed by springs 121, 122 between the peripheries of the reel support member 24 and drive wheel 106. Squeezing the idler wheel between these two members in this manner increases the force applied to the reel support member, as compared to a mere frictional engagement. As a result improved and more rapid braking of the reel support member is achieved.

Figure 7:
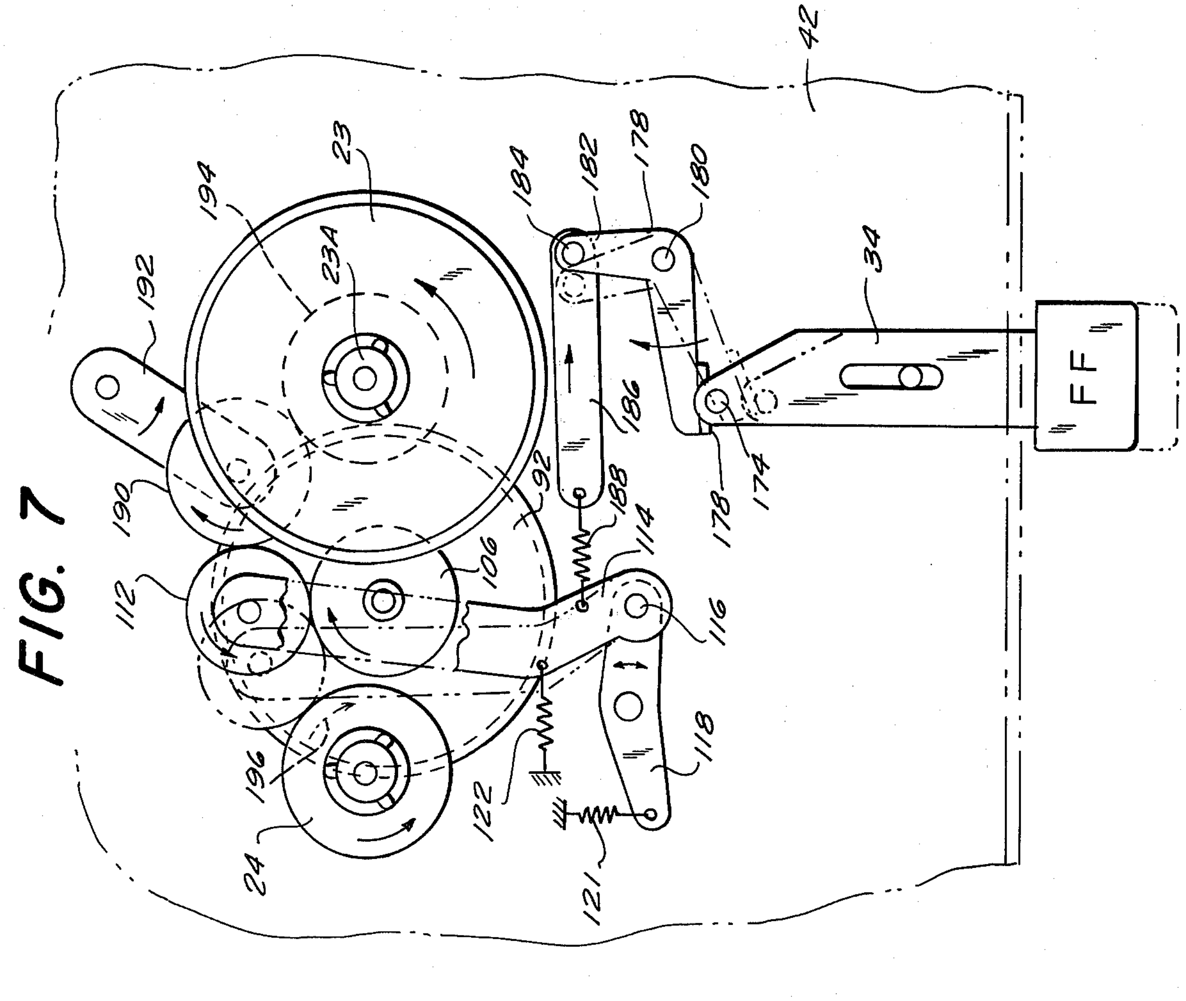
FIG. 7 is a plan view similar to FIG. 6 showing the configuration of the elements of the device in the fast forward mode of operation.

The fast forward mode of operation of the apparatus 10 is illustrated schematically in FIG. 7, wherein only the elements necessary to the operation of the fast forward drive mode of the device are shown for purposes of clarity. As seen therein the actuator bar 34' of the fast forward pushbutton 34 includes a downwardly extending pin 174 which abuts against a tab 176 formed on one end of a bell crank 178. The latter is mounted by a pivot pin 180 below the chassis plate 42, in any convenient manner, and has its opposite end 182 pivotally connected by a pin 184 to a connecting link 186. Link 186 is operatively connected, through a spring 188, to the lower end of idler lever 114. In the rewind and play modes of the apparatus, with the fast forward pushbutton 34 in its inoperative (i.e. its dotted line position in FIG. 7) the bell crank 178 is pivoted under the bias of spring 188 in a counterclockwise direction and does not affect the movements of lever 114 during the rewind and play modes. However, when the fast forward pushbutton 34 is moved to its operative solid line position in FIG. 7, pin 174 moves forwardly with actuator bar 34' to engage tab 176 and cause bell crank 178 to pivot in a clockwise direction. As a result, lever 114 is pivoted clockwise about its pivot connection 116 on auxiliary lever 118, thereby moving lever 114 and idler roller 112 from the normal dotted line position thereof in FIG. 7, to the solid line position shown therein. Simultaneously, of course, the movement of the fast forward pushbutton 34 to its operative position causes control plate 130 to move inwardly, as previously described and illustrated in FIG. 5, thereby releasing brake lever 146 from engagement with reel support member 23 and actuating the switch 142 to operate motor 82.

The apparatus 10 is provided with an auxiliary idler wheel 190 rotatably mounted on a lever 192 below chassis plate 42. As will be seen in FIG. 7, the auxiliary idler 190 is located such that when idler wheel 112 is moved to its solid line position upon actuation of the fast forward pushbutton 34, idler 112 is engaged between friction wheel 106 and auxiliary idler 190. Since friction wheel 106 is rotating in a clockwise direction due to its connection to main drive flywheel 92, idler wheel 112 is rotated in a counterclockwise direction, causing clockwise rotation of auxiliary idler 190. The latter is urged by the idler wheel 112 into engagement with a friction wheel 194 (integrally formed on the lower side of reel support member 23 and extending through plate 42 to the underside thereof) thereby to drive reel support member 23 in a counterclockwise direction at a greater speed of rotation that it is driven in the play mode. In this mode, it will be appreciated that the reel support member 24 is allowed to free wheel, and thus is rotated in a counterclockwise direction as tape is drawn from the reel coupled therewith to the cassette reel coupled with the reel support member 23.

When the fast forward pushbutton 34 is moved from its operative to its inoperative position, as for example, upon actuation of the stop pushbutton 30, bell crank 178 is released from the bias of pin 174 and returns to its original dotted line position illustrated in FIG. 7, thereby allowing lever 114, and thus idler roller 112, to return to their dotted line positions, in engagement with the reel support member 24 and the friction wheel 106. Simultaneously, of course, control plate 130, as illustrated in FIG. 5 returns to its initial inoperative position (shown in dotted lines in FIG. 5) to cause brake tab 158 to engage the periphery 160 of reel support member 23. Again, because the brake tab 158 has a smaller distance to travel than the idler wheel 112, the driven reel support member, i.e. the reel support member 23 in the fast forward mode, is subjected to a braking force before the free wheeling reel support member 24. Immediately thereafter the free wheeling reel support member 24 is braked by the engagement therewith of the idler wheel 112, which as previously described is squeezed between the reel support member 24 and the friction wheel 106 of flywheel 92 to apply a positive braking force thereto.

As with the play mode of operation of the device, when the fast forward pushbutton moves to its inoperative position, the power to motor 82 is shut off, but the main flywheel 92 tends to continue to rotate due to its inertia. Thus, when the counterclockwise rotating idler wheel 112 engages the counterclockwise rotating, and free wheeling, reel support member 24, the inertial rotation of the flywheel tends to urge the reel support member 24, through idler wheel 112, in a clockwise direction, as indicated by the dotted arrow 196 in FIG. 7, to simultaneously brake the reel support memberr and to slightly rewind tape onto the cassette reel coupled therewith.

Figure 8:
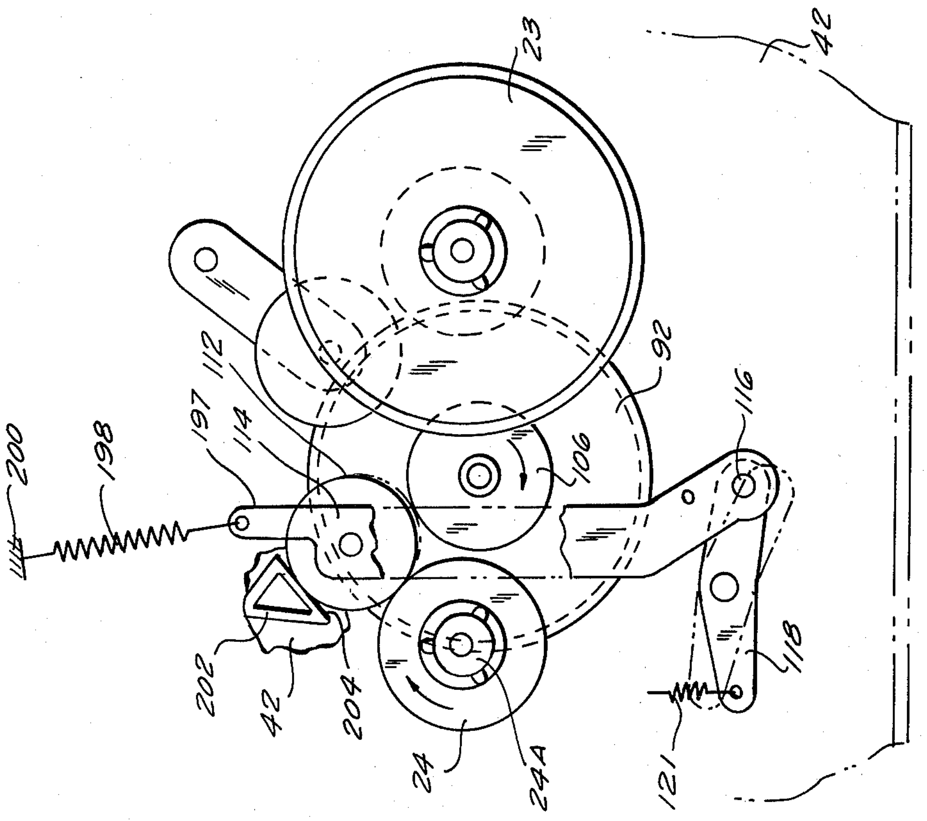
FIG. 8 is a plan view, similar to FIG. 6 showing a braking device in accordance with another embodiment of the present invention.

Another embodiment of a braking assembly for use with the apparatus 10 shown in FIGS. 1–7 is illustrated in FIG. 8. The apparatus in which the braking device of FIG. 8 is utilized is substantially identical to that shown in FIGS. 1–7 and therefore only the components of the device necessary to explain the operation of the modified braking device are illustrated in FIG. 8. As seen therein, the lever 114, mounted on auxiliary lever 118 by pivot pin 116, has an extension portion 197 to which a coil spring 198 is secured. The opposite end of the spring is connected to a tab 200 extending upwardly from the surface of the chassis plate 42, thereby to bias the lever 114 so that idler wheel 112 is held out of engagement with the friction wheel 106 of main drive flywheel 92 in its normal, inoperative position. The position illustrated in FIG. 8, therefore, corresponds to the position of the idler wheel 112 shown in solid lines in FIG. 3 and in dotted lines in FIGS. 6 and 7, but with the wheel held out of engagement with the friction wheel 106 due to the action of spring 198.

In the braking device of FIG. 8, chassis plate 42 is provided with an upwardly extending stop member 202 having an inclined surface 204 positioned to engage the peripheral surface of idler wheel 112 in its normal position during the inoperative mode of the apparatus. When the rewind button 28 is moved from its inoperative to its operative position, the movement of its associated actuator bar 28' causes auxiliary lever 118 to pivot downwardly, so that the idler wheel 112 is moved out of engagement with stop 202 and down into engagement with friction wheel 106, while it maintains engagement with the periphery of reel support member 24, thereby to transmit rotary motion from flywheel 92 to reel support member 24 for rewinding of tape onto the tape reel coupled therewith. This movement is shown in dotted lines in FIG. 8. When the rewind pushbutton 28 is moved to its inoperative position, the tension on auxiliary lever 118 produced by spring 121 is relieved, so that spring 198 moves idler wheel 112 out of engagement with friction wheel 106 and back into engagement with the surface 204 of stop member 202. Because of the location of spring 198 it tends to rotate lever 114 in a counterclockwise direction applying a biasing force on idler wheel 112 against the stop member 202 and reel support member 24, to brake the reel support member. It will be apparent that because of the location of the surface 204 of stop member 202 and the bias of spring 198, the idler wheel 112 is in effect squeezed between the surface 204 and the periphery of reel support member 24 to apply a braking force which is substantially greater than a mere frictional engagement between the idler wheel and the reel support member, thereby providing improved braking for the reel support member with a minimum of mechanical movement or parts, and in a compact arrangement.

In the play, record and forward fast modes of operation of the device, lever 114 is moved to drive reel support member 23 in the same manner as previously described with respect to FIGS. 6 and 7. However, when the apparatus is shut off, i.e. when the play or fast forward buttons are moved to their inoperative positions, idler wheel 112 returns to the position shown in FIG. 8 wherein it is squeezed between stop surface 204 and reel support member 24 by spring 198, in order to brake the reel support member 24. The reel support member 23 is, of course, braked by the brake tab 158 of lever 146, in the manner previously described.

Figure 9:
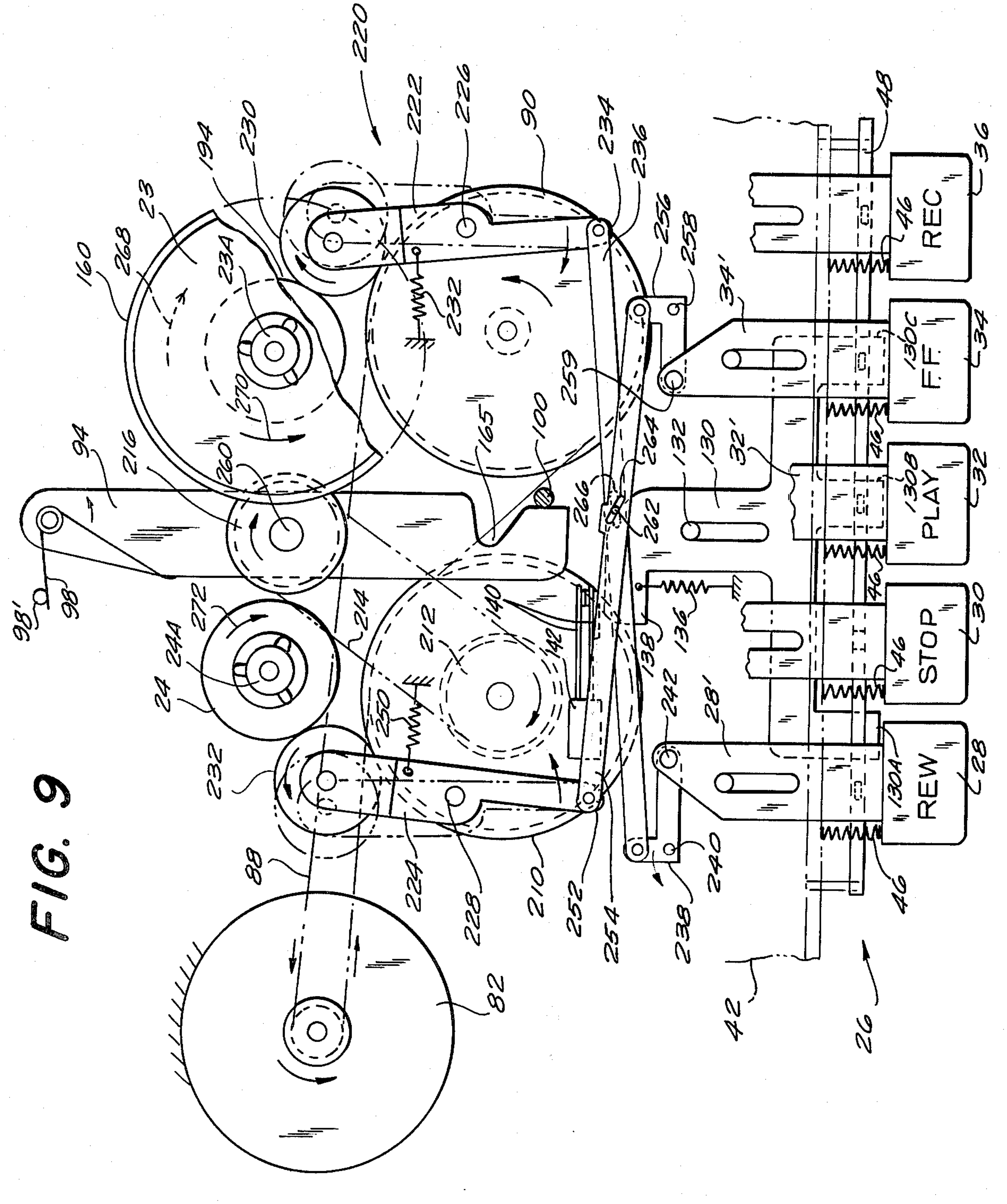
FIG. 9 is a plan view, similar to FIG. 1 of a magnetic recording and/or reproducing apparatus constructed in accordance with another embodiment of the present invention.

A further embodiment of the present invention is illustrated in FIG. 9. This embodiment consists of a recording and reproducing apparatus which is similar in construction to the apparatus illustrated in FIGS. 1–7, but which utilizes a somewhat different braking apparatus that simultaneously brakes both of the reel support members 23, 24 and rotates them in opposite directions upon braking in order to tighten tape on the cassette reels respectively coupled therewith. For convenience, elements shown in FIG. 9 which correspond to elements of the apparatus shown in FIG. 3 have been identified with the same reference numerals.

Basically, the apparatus shown in FIG. 9 includes a chassis plate 42 and a control assembly 26 which is identical to that shown in the apparatus of FIG. 3, in that it includes a plurality of pushbutton control members 28–36 and associated actuator bars which are held in normally inoperative positions by associated springs 46 and in selected operative positions by latch bar 48. A generally Y-shaped control member 130 slidably mounted on the lower surface of chassis plate 42 by a pin 132 has arm portions 130A, 130B, 130C respectively associated with the review, play, and fast forward pushbuttons so that the control member is moved with those pushbuttons. The control member is biased against the back surfaces of the pushbuttons 28, 30, 32 by the spring 136 secured between a downwardly extending tab on chassis plate 42 and the extension tab 138 of the control member. The latter is operative to close the contacts 140 of switch 142 upon forward movement of the control member 130 when the pushbuttons 28, 32, or 34 are moved from their inoperative to their operative positions, thereby to supply current to the motor 82.

Motor 82, in this embodiment of the invention, is connected by a belt 88 to drive two main flywheels 90, 210 with the belt being wrapped about the grooved periphery of flywheel 90 to rotate the latter in a counterclockwise direction and engaged with a portion of the grooved periphery of flywheel 210 to rotate that flywheel in a clockwise direction, as indicated by the arrows in the drawing. Flywheel 210 includes an auxiliary pulley 212 secured thereto or integrally formed therewith and having a grooved periphery about which a second belt 214 is trained. This belt serves to rotate an auxiliary flywheel 216 by engagement with the grooved periphery thereof. Auxiliary flywheel 216 is rotatably mounted on lever 94, which is spring biased in a clockwise direction by the spring 98. In the inoperative mode of the apparatus, and in all operating modes except the play and record modes, lever 94 is held in the position illustrated in FIG. 9 by the engagement of pin 100 on actuator bar 32' with the edge 104 of the lever, in the manner previously described.

The apparatus of FIG. 9 is provided with a brake assembly 220 adapted to simultaneously brake both of the reel support members 23 and 24 and to also form a part of the transmission for the apparatus. Essentially, the brake assembly consists of a pair of levers 222, 224 respectively associated with the flywheels 90, 210 and pivotally mounted on the lower surface of the chassis plate 42 by pivot pins 226, 228 respectively. The levers 222, 224 carry on their inner ends idler rollers 230, 232 respectively.

The idler wheel 230 is spring biased into engagement with the friction wheel 194 of reel support member 23 by a spring 232 operatively connected between the lever and a tab extending downwardly from the chassis plate 42 so that in its normal position the idler wheel also engages a peripheral extension of the flywheel 90, thereby to transmit rotation from the flywheel 90 to the reel support member 23. On the other hand, the end 234 of lever 222 opposite wheel 230 is connected in any convenient manner to the actuator bar 28' of rewind pushbutton 28 so as to be moved to its dotted line position in FIG. 9 when the rewind pushbutton is moved from its inoperative to its operative position. In the illustrative embodiment of the invention this connection is shown as consisting of a link 236 pivotally connected at one of its ends to the end 234 of lever 222, below chassis plate 42, and, at its opposite end, to a bell crank 238. The latter is pivotally connected below the chassis plate 42 on a pivot pin 240 and has one end thereof pivotally connected to a pin 242 extending downwardly through a slot (not shown) in chassis plate 42 from the actuator bar 28'. Accordingly, it will be appreciated that when the rewind pushbutton 28 is depressed, the actuator bar 28' thereof moves inwardly to cause counterclockwise rotation of bell crank 238, thereby moving lever 222 from its solid line position to its dotted line position allowing the reel support member 23 to rotate or free wheel under the rewind drive to the reel support member 24.

The rewind drive to reel support member 24 is provided by the idler wheel 232 on lever 224. The wheel 232 engages the periphery of reel support member 24 and also engages an extension of the periphery of flywheel 210, being biased into engagement therewith by a spring 250 connected between the lever and an extension tab depending downwardly from chassis plate 42. Idler wheel 232 is normally maintained by spring 250 in the solid line position thereof shown in FIG. 9 so as to transmit motion from the flywheel 210 to the reel support member 24. Since flywheel 210 rotates in a clockwise direction, it will rotate idler wheel 232 in a counterclockwise direction thereby causing rotation of reel support member 24 in a clockwise or rewinding direction.

Idler wheel 232 is moved from its solid line position to its dotted line position shown in FIG. 9 to allow reel support member 24 to freely rotate in the fast forward mode of operation of the device. To effect this action, the end 252 of lever 224 is connected in any convenient manner to the fast forward pushbutton 34. In the illustrative embodiment of the invention this connection is shown as consisting of a link 254 pivotally connected at its opposite ends to the ends 252 of lever 224 and to a bell crank 256 which in turn is pivotally mounted on a pin 258 depending from the lower surface of chassis plate 42. Bell crank 256 is pivotally connected at one end to actuator bar 34' of pushbutton 34 by a pin 259 which extends downwardly through a slot (not shown) in chassis plate 42. By this construction it will be appreciated that when the fast forward pushbutton 34 is depressed, i.e. moved to its operative position, it will cause clockwise rotation of bell crank 256, thereby moving the lever 224 against the bias of spring 250 in a counterclockwise direction, causing idler wheel 232 to move to its dotted line position so that the reel support member 24 can free wheel or rotate in response to the pull of tape from the cassette reel coupled therewith by means of the drive to reel support member 23 through the idler wheel 230 which, in this mode, remains in engagement between flywheel 90 and friction wheel 194.

In the play and record modes of the apparatus shown in FIG. 9, it is necessary for both idler wheels 230, 232 to be disengaged from their associated flywheels and reel support members so that the reel support member 23 can be driven at a relatively slow speed from the auxiliary flywheel 216 for reproducing or recording signals on the tape. As in the previously described embodiment, when the play pushbutton 32 is moved from its inoperative to its operative position, the pin 100 thereof enters the slot or notch 165 in lever 94, so that the lever can pivot in a counterclockwise direction under the influence of its associated spring 98. (In this embodiment of the invention the spring 98 is shown as a coil spring operatively connected between a post 98', depending downwardly from the chassis plate 42, and the lever 94.) This movement of the lever 94 causes the friction wheel 260, which is mounted with the flywheel (or integrally formed therewith) for rotation in the same direction, to engage the periphery 160 of the reel support member 23, thereby rotating the reel support at a relatively low speed.

The actuator bar 32' of the play pushbutton 32 must be connected to the levers 222, 224, in order to pivot the levers in opposite directions away from their associated reel support members when the play pushbutton is actuated. This can be done in any convenient manner by any convenient mechanical mechanism, as would be apparent to those skilled in the art. For illustrative purposes, the embodiment of the invention shown in FIG. 9 is shown to include a pin 262 formed on the actuator bar 32' and extending through slots 264, 266 in links 236, 254 respectively. These slots are slightly inclined with respect to the longitudinal axis of the links, so that upon forward movement of the actuator bar 32', i.e. movement of the bar towards the auxiliary flywheel 216, the pin 262 causes the links 236 and 254 to be cammed towards their associated bell cranks 238, 256 respectively, thereby pivoting the levers 222, 224 in the desired direction against the bias of their associated springs and freeing both of the reel support members from the idler wheels 230, 232 to allow reel support member 23 to be driven by engagement with the friction wheel 260.

By the above described construction of the embodiment of the invention shown in FIG. 9 it will be apparent that when any of the pushbuttons 28, 32, 34 are moved from their operative to their inoperative positions, plate 130 will move therewith, under the influence of spring 136, to open the contacts 140 and shut off the supply of current to motor 82. Simultaneously, the previously disengaged idler wheel 230 or 232 will be returned to its solid line position in FIG. 9 and act as a brake member against its associated reel support member. The other idler wheel will also act as a brake member due to the bias supplied thereto by its associated spring and because of the squeezing engagement of the idler wheel between its associated flywheel and reel support member.

For example, in the rewind mode of operation of the apparatus shown in FIG. 9, with idler wheel 232 in its solid line position engaged between its associated flywheel 210 and reel support member 24, and idler wheel 230 in its dotted line position, when the apparatus is stopped (e.g. upon actuation of the stop button 30) rewind button 28 will move to its inoperative position allowing bell crank 238 to pivot in a clockwise direction causing lever 222 to return to its solid line position under the influence of spring 232. This movement of lever 222 causes idler wheel 230 to engage between friction wheel 194 and flywheel 90, applying a braking force thereto. In addition, because of the location of the idler wheel 230 the wedging or squeezing effect between its associated flywheel and friction wheel 194 produces an increased force for braking the reel support member.

It is also noted that in the rewind mode of operation of the apparatus in FIG. 9, reel support member 23 will be rotating in a clockwise direction indicated by the dotted arrow 268 in the drawing. However, when the apparatus is shut off, and idler wheel 230 is engaged against friction wheel 194, the counterclockwise rotation of flywheel 90 (due to its inertia) will cause clockwise rotation of idler wheel 230 so that it in turn tends to rotate reel support member 23 in an opposite direction, i.e. a counterclockwise direction indicated by the arrow 270 in the drawing. This direction is opposite to the previous rewinding direction of that reel support member, and causes the reel support member to tend to rewind tape thereon as a result of the continued inertial movement of flywheel 90 after motor 82 is stopped. This counterclockwise rotation is a slight rotation since the rotation of both the reel support member and the idler wheel 90 are braked by the squeezing engagement of idler wheel 230 therebetween, but it is sufficient to insure proper tension in the tape and the prevention of formation of slack in the cassette.

Similarly, in the fast forward mode of operation of the apparatus wherein, as described above, idler wheel 230 is in driving engagement between the flywheel 90 and friction wheel 194, and idler 232 is in its dotted line position shown in FIG. 9; when the fast forward pushbutton is moved to its inoperative position, plate 130 moves therewith shutting off motor 82 and bell crank 256 pivots in a counterclockwise direction allowing idler wheel 232 to enter between the peripheries of the reel support member 24 and the flywheel 210, under the influence of spring 250, to apply a braking force to these members. However, because of inertia, flywheel 210 continues to rotate slightly in its counterclockwise direction after motor 82 is shut off, thereby causing counterclockwise rotation of idler wheel 232 as it is engaged with the reel support member 24. Since in the fast forward mode of operation of the apparatus the reel support member 24 is moving in a counterclockwise direction, the rotation of idler wheel 232 in its counterclockwise direction will cause a reverse rotation in reel support member 24 tending to drive it in a clockwise direction. This improves the braking effect on the reel support member, in conjunction with the frictional engagement therewith and the squeezing engagement of the idler wheel between the reel support member and the flywheel. In addition, this action of the idler wheel tends to cause reel support member 24 to slightly rewind tape on the cassette reel coupled therewith in order to insure proper tension in the tape.

Finally, in the play mode or in the record mode wherein both the play and record buttons are depressed, the idler wheels 230 and 232 are both in their dotted line positions as described above. When the play pushbutton is moved from its operative to its inoperative position, the movement of its pin 262 in the slots 264, 266 allows the levers 222, 224 to return towards each other under the influence of their associated springs 232, 250 so as to engage their associated idler wheel with the respective reel support members, thereby to apply a braking force thereto. In this embodiment, since both the flywheels 90 and 92 will tend to continue to rotate after the shut off of motor 82 in their respective directions due to their inertia, their engagement with their associated idler wheels 230, 232 will cause rotation of the reel support members 23, 24 in opposite directions, as indicated by the arrows 270, 272 shown in FIG. 9. Thus, not only is the braking force applied to these elements, as described above, but also the reel support members are slightly rotated in opposite directions in order to tighten tape on the cassette reels coupled therewith.

It will be apparent that the braking apparatus of the various embodiments of the present invention described herein are adapted to cause rapid and positive braking of the respective reel support members during operation of the device. Each of these braking devices is relatively simple in construction and requires a minimum number of components. They are also compact and particularly adapted for use in portable tape recording and reproducing devices. Moreover, the brake devices of the invention are used for dual purposes as part of the transmission of the apparatus and as brake members, thereby reducing the number of components required for the apparatus as compared to previously proposed constructions. Still further, as previously described, the idler wheel brake members of the apparatus described above serve to rotate their associated reel support members in a direction to tighten tape thereon after the apparatus is shut off, thereby to insure proper winding of tape in the cassette.

Although illustrative embodiments of the present invention have been described herein in detail with reference to the accompanying drawings, it is to be understood that the invention is not limited to those precise embodiments, and that various changes and modifications may be effected therein by one skilled in the art without departing from the scope and spirit of this invention.

What is claimed is:

1. An apparatus for recording and/or reproducing signals on a magnetic tape extending between first and second tape reels to which the ends of the tape are secured and on which the tape may be wound; said apparatus including first and second rotatable reel support members for rotational coupling with the first and second tape reels respectively; drive means having at least one main drive wheel; drive control means for selectively activating and deactivating said drive means; transmission means responsive to said control means for selectively operatively engaging said main drive wheel with one of said support members to rotatably drive the selected support member in the direction for winding tape on the reel respectively coupled therewith in response to activation of said drive means by said control means; said transmission means including a freely rotatable idler wheel mounted in said apparatus for movement between a plurality of positions in and out of driven engagement with said main drive wheel to selectively transmit the driving force of said drive wheel to the selected support member; means for engaging said idler wheel against one of said reel support members, upon deactivation of said drive means, with sufficient force to brake rotation of that support member; and a further brake member to be selectively engaged against the other reel support member; the idler wheel and the further brake member being engaged against their respective reel support members in rapid succession so that the driven reel support member is braked before the undriven reel support member upon deactivation of said drive means.

2. An apparatus as defined in claim 1 wherein said engaging means includes resilient means biasing said idler roller towards said one reel support member.

3. An apparatus as defined in claim 2 wherein said engaging means includes a stop member positioned adjacent to and spaced from said one reel support member in a predetermined position to receive and engage said idler wheel between the stop and said one reel support member when said drive means is deactivated whereby said idler wheel is squeezed between the stop and the one reel support member to apply a braking force on said one reel support member.

4. An apparatus as defined in claim 3 wherein said stop comprises a flat surface extending parallel to the axis of rotation of said idler wheel and inclined toward said one reel support member to define a space of decreasing dimensions in the direction of movement of the idler wheel towards said one reel support member.

5. An apparatus as defined in claim 2 wherein said at least one main drive wheel is located adjacent to and slightly spaced from said one reel support member; said drive wheel and said one reel support member each having peripheral drive surfaces located in substantially the same plane, said idler wheel being normally located in said plane in position to simultaneously engage said main drive wheel and said one reel support member when said apparatus is deactivated, said resilient means biasing said idler between said main drive wheel and said one reel support member whereby the idler is squeezed therebetween to apply said braking force.

6. An apparatus as defined in claim 5, wherein said control means includes means for selectively conditioning said transmission to drive said tape reels in forward and rewind directions; said transmission means including means for moving said idler wheel out of engagement with said one reel support member when said tape reels are driven in the forward direction and for releasing the idler wheel upon deactivation of said drive means to return, under the influence of said resilient means, to said position thereof wherein the idler wheel is simultaneously engaged with the main drive wheel and said one reel support member, whereby the rotary inertia of said main drive wheel, upon deactivation of said drive means, causes slight rotation of said idler wheel thereby to slightly rotate said one reel support member in the rewind direction while braking rotation thereof.

7. An apparatus as defined in claim 1 wherein said transmission means includes a pair of freely rotatable idler wheels respectively associated with said reel support members and mounted for movement between positions in and out of driven engagement with their associated reel support member; and means associated with each of said idler wheels for engaging each idler wheel against its associated reel support member with sufficient force to brake rotation of its associated support member.

8. An apparatus as defined in claim 7 wherein said drive means includes a pair of oppositely driven main drive wheels respectively associated with said reel support members, said drive wheels and reel support members each having peripheral drive surfaces located in substantially the same plane adjacent to and slightly spaced from each other to define a generally tapered space therebetween; said idler wheels being respectively located tomove in the space between their associated reel support member and drive wheel; and means for biasing said idler wheels into engagement with the drive surfaces of their associated reel support member and drive wheel whereby upon deactivation of said drive means said idler wheels are squeezed in said spaces to brake their associated support members.

9. An apparatus as defined in claim 8 wherein said control means includes means for selectively conditioning said transmission means to drive said tape reels in forward and rewind directions; said transmission means including means for selectively disengaging one of the idler wheels from its associated drive wheel in accordance with the selected direction of tape movement whereby the other of said idler wheels transmits the rotation of its associated drive wheel to its associated reel support member to drive that reel support member in the selected direction of tape travel; said disengaged idler wheel returning to its position between its associated reel support member and drive wheel upon deactivation of said drive means whereby the rotary inertia of the drive wheel associated with the disengaged idler wheel, upon deactivation of the drive means, is transmitted through that idler wheel to slightly rotate its associated reel support member in a direction opposite to the selected direction of tape movement thereby to tighten the tape on said reels while braking rotation thereof.

10. An apparatus as defined in claim 9 wherein the engagement of one of said idler wheels with its associated drive wheel and reel support member causes forward movement of the tape at a "fast forward" speed; said means for selectively conditioning said transmission means including means for conditioning the transmission means to drive the last mentioned reel support member in a forward direction at a "play" speed; and said transmission means including a third drive wheel for selectively driving said last mentioned reel support member at said play speed, and means for disengaging both of said idler wheels from their associated reel support members when said tape is moved at said play speed; both of said idler wheels returning to their normal positions between their associated reel support member and drive wheel upon deactivation of said drive means, whereby the rotary inertia of the drive wheels associated with the disengaged idler wheels, upon deactivation of the drive means, is transmitted through the idler wheels to slightly rotate their associated reel support members in opposite directions thereby to tighten the tape on the reels while braking rotation thereof.

11. An apparatus as defined in claim 1 wherein said drive control means includes switch means having a normal inoperative condition and being actuable to an operative condition for energizing said motor; and means movable from an inoperative position to an operative position for actuating said switch means to said operative condition thereof and for simultaneously controlling said transmission means to drive said reel support members in a selected direction and at a selected speed.

* * * * *